March 15, 1966     J. BAUDE     3,241,074
DEVICE FOR SENSING THE CONTOUR OF ELECTRIC PULSES
Filed Aug. 24, 1961     3 Sheets-Sheet 2

Inventor
John Baude
by Warren F.B. Lindley
Attorney

March 15, 1966        J. BAUDE        3,241,074

DEVICE FOR SENSING THE CONTOUR OF ELECTRIC PULSES

Filed Aug. 24, 1961        3 Sheets-Sheet 3

Inventor
John Baude
By Warren F.B. Lindley
Attorney

//  # United States Patent Office 3,241,074
Patented Mar. 15, 1966

3,241,074
DEVICE FOR SENSING THE CONTOUR OF ELECTRIC PULSES
John Baude, Milwaukee, Wis., assignor to Allis-Chalmers Manufacturing Company, Milwaukee, Wis.
Filed Aug. 24, 1961, Ser. No. 133,725
6 Claims. (Cl. 323—108)

This invention relates to protective relay systems and more particularly to a new device for sensing the contour of electric pulses emitted from a source of pulses.

The use of electrical pulses for controlling power sources, transmitting information and for numerous other uses in, for example, logic and related circuits has recently been accelerated. With such use of pulses comes the need for sensing the contour of the pulses so as to protect the equipment associated therewith. Relays commonly used on power lines sense a continuous flow of electrical power measuring the rate of power flow, the magnitude of current and/or voltage and the phase angle. The disclosed and claimed relay senses an intermittent flow of pulses and particularly the simultaneous width and amplitude of each and every pulse. This is a radical departure from the structures and methods used heretofore for protective control of power sources.

To meet the needs of new types of electronic power sources with a relay device, a relay is needed to simultaneously sense the amplitude and width of single repetitive pulses and to be triggered into operation upon the variation of either or both characteristics of a pulse beyond given limits.

In accordance with the invention disclosed a new and improved device for sensing the contour of electric pulses emitted from a source of pulses is provided. This device comprises a pulse duration sensing circuit comprising a first pulse repeater circuit connected to the source. A pulse time reference circuit and a pulse phase inverting circuit are each connected to the first pulse repeater circuit. A second pulse repeater circuit is connected to the pulse time reference circuit and a pulse comparison circuit is connected to the second pulse repeater circuit and the phase inverting circuit. A third pulse repeater circuit is connected to the comparison circuit for receiving variable residual pulses emitted by the pulse comparison circuit and means connected to the third pulse repeater circuit are provided for sensing the residual pulses. This device further provides means for simultaneously sensing the amplitude of electric pulses comprising an adjustable voltage divider, a pulse repeater circuit and a reference voltage means. The adjustable voltage divider is connected to the pulse repeater circuit through the reference voltage means. Means are connected to the repeater circuit for sensing its action.

It is, therefore, one object of this invention to provide a new and improved relay structure.

Another object of this invention is to provide a new and improved static relay structure which senses the contour of individual electric pulses.

A further object of this invention is to provide a new and improved static relay structure which simultaneously senses the amplitude and duration of electric pulses.

A still further object of this invention is to provide a new and improved relay structure which monitors electric pulses and upon predetermined conditions of at least one of said pulses providing a signal which controls an electrical device.

Objects and advantages other than those set forth will be apparent from the following description when read in connection with the accompanying drawing, in which.

Figure 1:
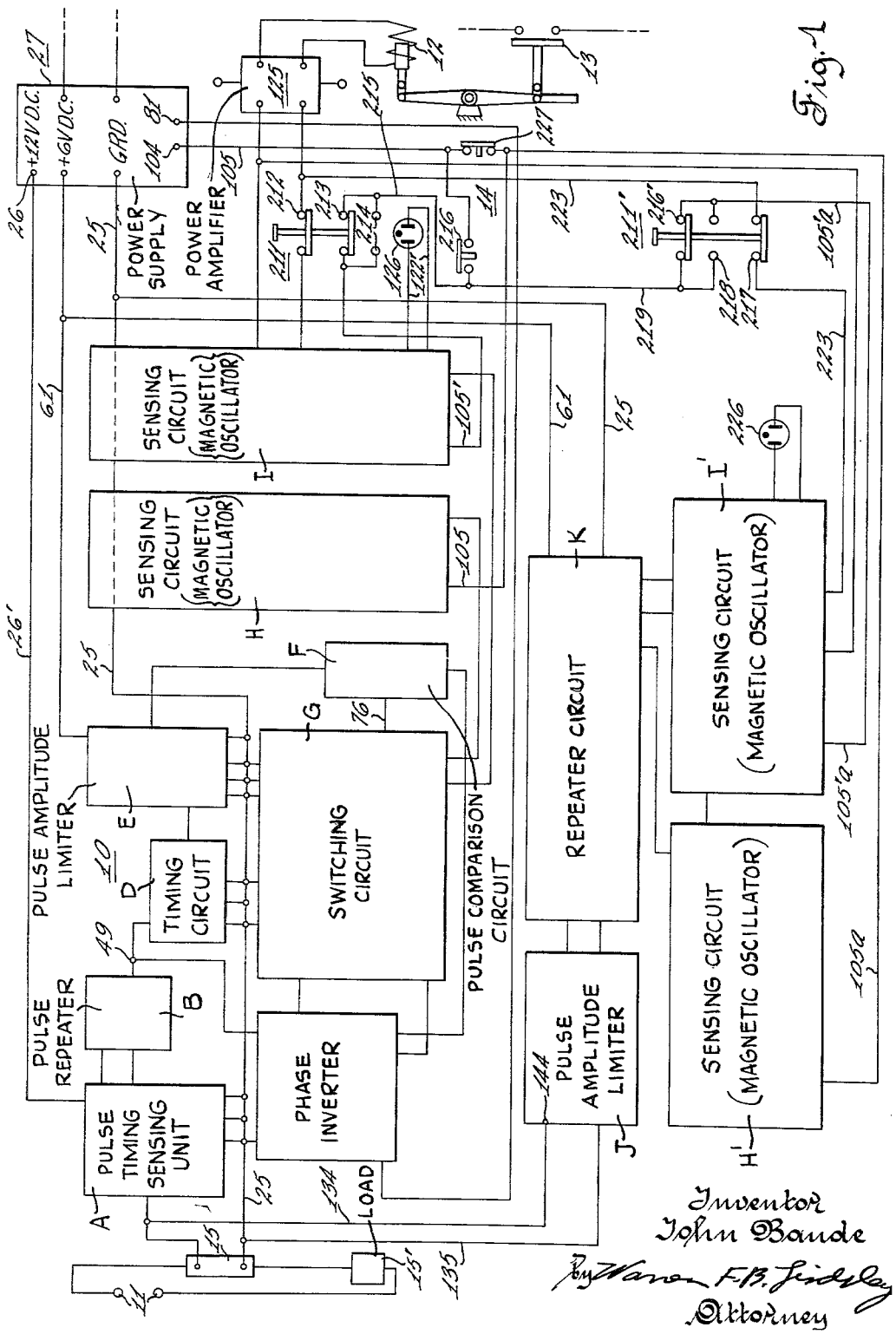
FIG. 1 is a block diagram of an improved protective relay system embodying the invention.

It will be apparent that the basic principles of the invention can be applied in various ways to perform the sensing and control functions required for different installations. However, in order to illustrate the invention a typical embodiment has been shown in the drawings applied to the control and protection of a power source through the operation of a circuit breaker.

Figure 2:
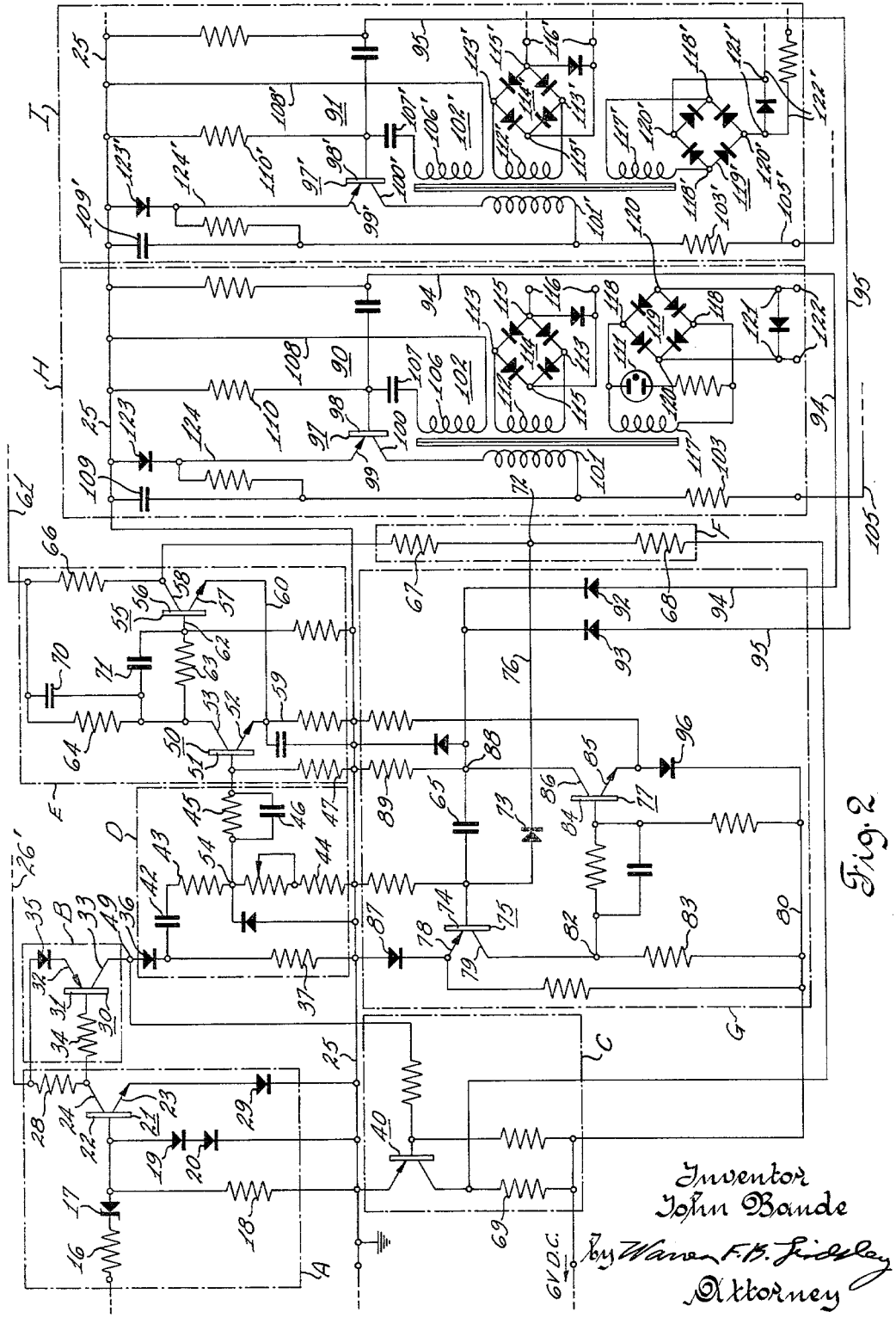
FIG. 2 is a diagrammatic view of a part of the circuitry illustrated in FIG. 1.
Figure 3:
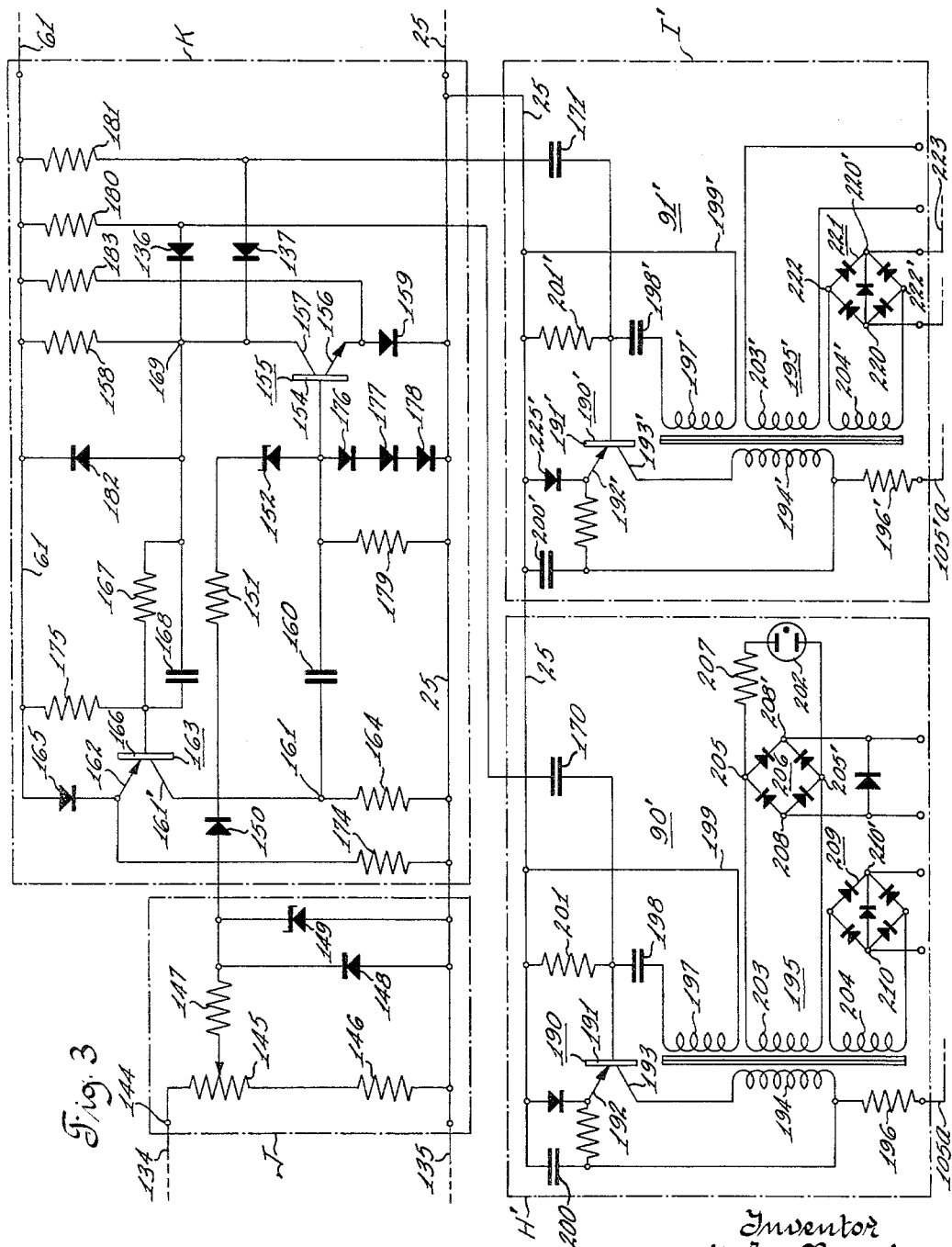
FIG. 3 is a diagrammatic view of another part of the circuitry illustrated in FIG. 1.

Referring more particularly to the drawings wherein like parts are designated by like characters of reference throughout the figures, FIG. 1 illustrates a block diagram of a protective relay system 10 which is utilized for sensing a variable electrical condition in a power source 11. FIGS. 2 and 3 illustrate most of the circuitry used in the block diagrams of FIG. 1.

The power source 11 provides a signal which may be in the form of single repetitive pulses which are sensed by two parts of the relay structure. These parts of the relay structure may be called a timing unit shown in FIG. 2 and a pulse amplitude sensing unit shown in FIG. 3. The timing unit comprises the block diagrams referred to by reference characters A through I while the pulse amplitude sensing unit comprises the block diagrams referred to by reference characters J, K, H' and I'. Further, a trip coil 12, circuit breaker 13 and related circuitry 14 are shown for controlling the power source 11.

The block A diagrammatically represents a pulse timing sensing unit. This pulse timing or duration sensing unit is connected across a shunt 15, said shunt being connected in series with a load 15' arranged across the power source 11. The input pulse from shunt 15 is fed through a resistor 16, a zener diode 17 and applied between resistor 18 and diodes 19 and 20 to a base 22 of transistor 21. Transistor 21 further comprises an emitter 23 and a collector 24. The collector 24 and emitter 23 are connected in series circuit between a ground conductor 25 and the direct current twelve volt positive terminal 26 of a regulated control power supply 27 through a resistor 28 and a diode 29.

The block B diagrammatically represents a pulse repeater circuit and comprises a transistor 30 having a base 31, emitter 32 and collector 33, base 31 being connected through a resistor 34 to collector 24 of transistor 21. Collector 33 and emitter 32 of transistor 30 are connected in series circuit through a diode 35, a diode 36 and a resistor 37 between ground conductor 25 and the twelve volt positive D.C. terminal 26 of supply 27 through conductor 26'.

The pulses that appear on the base of transistor 30 will always be of a predetermined value such as twelve volts D.C. One or more pulses may be applied to base 31 of transistor 30 with a varying time duration but with a fixed amplitude. Since the pulse timing sensing unit shown in block A is designed to function for a minimum pulse input of, for example, two volts from the signal source, the output of this pulse limiter will never exceed twelve volts even though the input pulse may be one hundred volts or more because transistor 21 is driven to saturation and the maximum voltage that transistor 21 can apply to resistor 34 connected in series with base 31 of transistor 30 is twelve volts D.C.

Transistor 21 functions as a pulse repeater. Any time it receives a pulse from shunt 15 it conducts and triggers transistor 30 into conduction. When transistor 30 repeats the time of the pulse that transistor 21 emits, it supplies a voltage to a pulse phase inverter circuit shown in block C and deenergizes a normally conducting transistor 40 simultaneously with the injection of a pulse through diode 36 into the R-C timing circuit formed by capacitor 42, resistor 43, resistor 44, resistor 45, capacitor 46 and resistor 47 in the pulse time reference circuit shown in block D. The pulse height which is applied to the timing circuit in block D must be accurately controlled because capacitor 42 is charged as a function of the amplitude of the power supply 27 and in accordance with the R-C constant of the timing circuit of capacitor 42 and resistors 43, 44 and 45. In one of the applications of the described circuitry the R-C time constant must be smaller than the time duration of the pulse which is being measured in order to get relay function. Capacitor 42 then is charged and the charge decays in an exponential function and when the charge is below a certain value a transistor 50 is cut off. Transistor 50 comprising a base 51, emitter 52 and collector 53 has its base 51 connected to resistor 45 and capacitor 46 as shown in FIG. 2 and to a point 54 in the series circuit between resistors 43 and 44.

Thus, a positive pulse appearing in the circuit in block A is converted to a pulse of constant height and repeated by circuitry in block B and split at point 49 into two channels. One channel feeds the inverter in block C and the other channel feeds block D which is a time reference circuit consisting of the adjustable R-C time elements described. The output of the R-C time element circuit of block D is fed into transistor 50 of the monostable flip flop or pulse repeater circuit having a predetermined pulse amplitude limiter shown in block E. The flip flop circuit comprises transistors 50 and 55. Transistor 55 comprises a base 56, emitter 57 and collector 58. The emitters and collectors of transistors 50 and 55 are connected in different series circuits 59 and 60, respectively, across a source of potential such as a positive six volt direct current source of the power supply 27 extending between conductor 61 and ground conductor 25. Base 56 of transistor 55 is connected through a conductor 62 and resistor 63 to circuit 59 and collector 53 of transistor 50.

Any time a pulse appears at the base 51 of transistor 50, transistor 50 becomes conductive and when it does transistor 55 which is kept normally conductive by action of resistors 63 and 64 is cut off. When transistor 55 is cut off a regulated positive potential of six volts direct current is applied to the voltage divider formed by resistors 66, 67, 68 and 69 some of which are in the circuitry of block F known as a pulse comparison circuit which tends to balance the six volts regulated potential which is controlled and applied by transistor 40 to the other side of the voltage divider in a manner hereinafter described. The appearance of a signal through action of transistor 55 on these resistors is slightly delayed by capacitor 70 arranged in series with capacitor 71 between conductor 61 and base 56 of transistor 55. The reason for this is that transistors are not instantaneous switching devices and current needs a certain time to rise and fall. Since the signal pulse has been transmitted through several transistors the timed pulse compared with the measured pulse must be delayed to give the transistors time to function, otherwise a residual pulse remains which can trigger falsely the hereafter described oscillators into operation.

At the same time that a time positive pulse is applied across resistors 66, 67, 68 and 69, a negative pulse is emitted by transistor 40 and is imposed on the other side of the comparison circuit in block F. The potential of the balance point 72 against ground conductor 25 is an indication of whether the pulse as emitted by the signal source 11 is shorter in duration or longer than the reference pulse in block D.

Thus, the signal source emits a pulse which triggers at that instant a timing reference and this timing reference imposes a positive pulse on one side of the comparison circuit, and the inverted negative pulse of the same duration as the signal source pulse 11 is imposed on the other side of the comparison circuit. The difference between the positive and negative pulses appears as a potential between ground conductor 25 and point 72. This potential is imposed upon the base 74 of transistor 75 through conductor 76. Assuming diode 73 is poled as shown in FIG. 2 and there is a negative residual difference between the pulses measured by the comparison circuits in block F the monostable power flip flop, repeater and polarity sensitive or polarized circuit comprising transistors 75 and 77 shown in block G, and oscillators shown in blocks H and I through capacitor 65 will be triggered into operation. This negative residual voltage also renders transistor 75 conductive so that current flows through its emitter 78 and collector 79 in series circuit connected between ground conductor 25, diode 87, emitter 78, collector 79, resistor 83 and a conductor 80 connected to a negative six volt direct current terminal 81 of the control power supply 27. The circuitry in block G, thus, may receive from the comparison circuitry in block F polarized, variable intensity unidirectional residual pulses. When transistor 75 is rendered conductive point 82 arranged between resistor 83 and collector 79 of transistor 75 assumes a less negative potential than when transistor 75 is not conducting. When point 82 is rendered less negative than before, the base 84 of transistor 77 is rendered less negative and transistor 77 becomes conductive. Transistor 77 comprises further an emitter 85 and a collector 86 connected in series circuit between ground conductor 25, resistor 89, point 88, collector 86, emitter 85 of transistor 77, diode 96 and conductor 80 connected to the negative six volt direct current terminal 81 of the control power supply 27. When point 82 is less negative than before, transistor 77 is rendered conductive and point 88 emits a signal to magnetic oscillators 90 and 91 shown in blocks H and I, respectively, through diodes 92 and 93 forming a part of conductors 94 and 95. Thus, a negative pulse is emitted into the two logic diodes 92 and 93 when a residual pulse is sensed. When a residual pulse is sensed it is intended that the circuit breaker be tripped because this indicates an overload or a variation of the source of pulses beyond predetermined limits.

The residual pulse is passed through diodes 92 and 93 which are poled in the same direction as diode 73 into the two circuits formed by conductors 94 and 95 and to the oscillator or sensing circuits in blocks H and I.

In blocks H and I are shown single transistor magnetic coupled oscillators 90 and 91 which are suitable for use as reliable static switches particularly under conditions where electrical isolation of the load circuits from the control circuit is essential.

In blocks H and I transistors 97, 97′ comprise bases 98, 98′, emitters 99, 99′ and collectors 100, 100′. The emitters 99, 99′ and collectors 100, 100′ are connected in series with the low potential windings 101, 101′ of impedance changing transformers 102, 102′ and resistors 103, 103′ across a source of a six volt direct current potential on terminal 104 of the control power source 27 though conductors 105, 105′ and ground conductor 25. High potential windings 106, 106′ of transformers 102, 102′ have one end connected to the bases 98, 98′ through capacitors 107, 107′ and the other ends connected through conductors 108, 108′ to the ground terminal of the control power supply 27 through ground conductor 25. Capacitors 109, 109′ are connected in shunting arrangement with emitters 99, 99′ and collectors 100, 100′ and in series with resistors 103, 103′ across the six volt direct current source formed between the ground 25 of the source of supply 27 and terminal 104 thereof. The emitters 99, 99′ are biased with respect to the bases 98, 98′ by resistors 110, 110′ which, for example, may be of relatively low resistance such as from 30 to 50 ohms. These resistors are connected directly across the emitters and bases of transistors 97, 97′ and provide "off" stability without the use of a reverse bias voltage usually provided in the prior art by a separate battery. The circuits comprising the series connection of resistors 103, 103' and capacitors 109, 109' across the source of six volt direct current supply heretofore described are timing circuits for providing certain time delays for applying the full value of the control voltage of the six volt supply to the oscillator switches 90, 91, thereby preventing the inductive effect of the leakage current flowing through windings 101, 101' from triggering off the oscillator switches prematurely.

The oscillator circuit in block H is used to ignite a target light 111 indicating that the relay system 10 has functioned as a protective unit. The oscillator circuit in block I is arranged to energize a load circuit which may be, for example, a static trip power amplifier 125 which in turn energizes the trip coil 12 of the power circuit breaker 13.

High potential or load windings 112, 112' are applied to transformers 102, 102', respectively, and have their terminals connected to the input terminals 113, 113' of rectifiers 114, 114'. Load terminals 115, 115' of rectifiers 114, 114' are connected to terminals 116, 116', respectively, of a pair of load circuits. The terminals 116' of oscillator 91 are connected to power amplifier 125. A further pair of high potential or load windings 117, 117' are applied to transformers 102, 102', respectively, and have their terminals connected to the input terminals 118, 118' of rectifiers 119, 119'. Load terminals 120, 120' of rectifiers 119, 119' are connected to terminals 121, 121', respectively, of a pair of load circuits 122, 122'. Load circuit 122' is connected in series with an indicating lamp 126.

When a residual pulse is passed through diodes 92 and 93 into the two circuits formed by conductors 94 and 95 and to the oscillator circuits in blocks H and I, the oscillator circuits are energized, otherwise they are in the deenergized condition. The residual pulse makes the bases 98, 98' of transistors 97, 97' momentarily negative with respect to their emitters 99, 99' and current now passes from the source of supply 27 through the ground conductor 25, diodes 123, 123', conductors 124, 124', emitters 99, 99' and collectors 100, 100' of transistors 97, 97', respectively, windings 101, 101' of transformers 102, 102', resistors 103, 103', conductors 105, 105' to terminal 104 of the source of supply 27. This current flow induces in windings 106, 106' of transformers 102, 102' currents of such polarity that transistors 97, 97' are kept conductive until the cores of transformers 102, 102' reach a state of saturation at which time transistors 97, 97' cease to conduct current through the emitter collector circuits and the magnetic energy stored in the cores of transformers 102, 102' is used to induce a current of opposite polarity in windings 112, 117 and 112' and 117' of transformers 102, 102', respectively. The current flowing in windings 112, 117 and 112' and 117' is essentially an alternating current of a looped configuration other than square current wave form. The looped configuration described occurs because of the smoothing effect of the low resistance of resistors 110, 110' in combination with capacitors 107, 107' and the reactance of windings 106, 106'.

The signal of source 11 is split into two channels at shunt 15 and is fed through conductors 134 and 135 as shown in FIG. 1 to the circuitry of blocks J, K, H' and I' which are known as the pulse amplitude discriminator of the contour relay structure 10. Block J which represents the pulse amplitude limiter or voltage reference circuitry receives a signal from shunt 15 through conductors 134 and 135 and emits and dispatches a signal to the circuitry of block K which is known as a power flip flop or repeater circuit of the monostable type feeding the signal through a pair of diodes 136 and 137 into two magnetic oscillator or sensing circuits of the kind shown in blocks H and I.

Signal pulses emitted by shunt 15, more particularly, are passed to potentiometer 145 and resistor 146 connected between terminal 144 and ground conductor 25.

A portion of these pulses are transmitted through resistor 147, diode 150, resistor 151, zener diode 152 to the base 154 of transistor 155. The portion of the pulses passed are regulated by potentiometer 145 and a portion of the passed pulse is then passed by zener diode 152 if the pulse amplitude exceeds the zener voltage rating of said diode. Pulses exceeding the zener voltage rating of diode 152 trigger transistor 155 into conduction. A pair of diodes 148 and 149 are arranged between resistor 147 and ground conductor 25. Diode 148 is provided to prevent a reversal of the polarity input of the input pulses and the resulting damage to the transistor 155. Diode 149 is a zener diode which is provided for voltage protection of transistor 155 so that the base to emitter potential cannot exceed the particular rating for the transistor under conditions of excessively high input voltages. Transistor 155 comprising base 154, emitter 156 and collector 157 has its collector and emitter connected in series circuit with a resistor 158 and diode 159 across conductor 61 which is connected to the positive six volt terminal of the power supply 27 and the ground conductor 25. Base 154 of transistor 155 is further connected through a capacitor 160 to a point 161 connected in a series circuit of the collector 161' and emitter 162 of a transistor 163 and resistor 164 and a diode 165 between conductor 61 and the ground conductor 25. A base 166 of transistor 163 is connected through a parallel arrangement of resistors 167 and capacitor 168 to a point 169 between resistor 158 and collector 157 of transistor 155 in its series emitter collector circuit heretofore described. When transistor 155 is triggered into conduction by a pulse passed to its base 154 from potentiometer 145 through resistor 147, diode 150, resistor 151 and zener diode 152, point 169 assumes a less positive potential and since it is connected to the base 166 of transistor 163 through the parallel arrangement of resistor 167 and capacitor 168 transistor 163 is also rendered conductive which raises the positive potential of point 161. By so doing, the base 154 of transistor 155 receives an additional positive impulse which locks transistors 155 and 163 momentarily in saturated conduction. Since capacitor 160 eventually charges up to the existing potential difference between base 154 of transistor 155 and point 161 the circuit functions as a monostable flip flop circuit and resets automatically after capacitor 160 has charged to the potential difference between base 154 and point 161.

When the flip flop circuit described involving transistor 155 and 163 functions under pulses of a predetermined amplitude controlled by zener diode 152 point 169 assumes a less positive potential difference than when the flip flop circuit is inactive and this potential difference is imposed on diodes 136 and 137 and capacitors 170 and 171 associated therewith in the manner shown in FIG. 3. Oscillators 90' and 91' in blocks H' and I' are connected to these capacitors and are triggered into conduction and operate as heretofore described to perform switching functions.

A resistor 174 connected between emitter 162 of transistor 163 and ground conductor 25 is provided to circulate a small current through diode 165 for stabilizing purposes and to create a voltage drop of .6 volt reverse bias for proper operation of transistor 163. A resistor 175 connected in shunting arrangement across the base 166 of transistor 163 and conductor 61 is provided for tying the base to positive potential source through conductor 61.

Diodes 176, 177 and 178 connected in series arrangement between base 154 of transistor 155 and ground conductor 25 are provided for additional protection for bypassing an excessive amount of current from base 154 to ground. Resistor 179 shunting diodes 176, 177 and 178 provides stability of transistor 155 under high temperature conditions.

Resistors 180 and 181 connected between diodes 136 and 137, respectively, and conductor 61 provide stability for oscillators 90′ and 91′ shown in circuits H′ and I′, thereby preventing a premature triggering thereof. Diode 182 connected to the circuit between point 169 and conductor 61 and in comibnation with the parallel arrangement of resistor 167 and capacitor 168 provides for base to emitter protection of transistor 163. Resistor 158 is the load resistor for transistor 155. Resistor 183 in series with diode 159 between conductors 61 and 25 as shown in FIG. 3 provide temperature stability of transistor 155.

The pulses passed by diodes 136 and 137 are fed to capacitors 170 and 171, respectively, and to the oscillator circuits in blocks H′ and I′. The oscillators 90′ and 91′ are essentially the same as oscillators 90 and 91 of blocks H and I.

In blocks H′ and I′ transistors 190 and 190′ comprise bases 191, 191′, emitters 192, 192′ and collectors 193, 193′. The emitters and collectors are connected in series with low potential windings 194, 194′ of impedance changing transformers 195, 195′ and resistors 196, 196′ across the six volt direct current potential on terminal 104 of the power source 27 through conductors 105a, 105, 105′a and 105′ and ground conductor 25. High potential windings 197, 197′ of transformers 195, 195′ have one end connected to the bases 191, 191′ through capacitors 198, 198′ and the other ends connected through conductors 199, 199′ to the ground terminal of the control power supply 27 through ground conductor 25. Capacitors 200, 200′ are connected in shunting arrangement with emitters 192, 192′ and collectors 193, 193′ and in series with resistors 196, 196′ across the six volt direct current source formed between the ground 25 of the source of supply 27 and terminal 104 thereof. The emitters 192, 192′ are biased with respect to the bases 191, 191′ by resistors 201, 201′ which, for example, may be of relatively low resistance such as from 30 to 50 ohms. These resistors are connected directly across the emitters and bases of transistors 190, 190′ and provide "off" stability without the use of a reverse bias voltage usually provided in the prior art by a separate battery. The circuits comprising the series connection of resistors 196, 196′ and capacitors 200, 200′ across the source of six volt direct current supply are buffer circuits for providing certain time delays for applying the full value of the control voltage of the six volt supply to the oscillator switches 90′ and 91′, thereby preventing the inductive effect of the laekage current flowing through windings 194, 194′ from triggering off the oscillator switches prematurely.

The oscillator circuit in block H′ is used to ignite a target light 202 indicating that the relay system 10 has functioned as a protective unit. The oscillator circuit in block I′ is arranged to energize the trip power amplifier 125 which in turn energizes the trip coil 12 of the power circuit breaker 13.

A pair of high potential or load windings 203, 204 and 203′ and 204′ are applied to transformers 195, 195′, respectively. Winding 203 of transformer 195 has its terminals connected to the input terminals 205, 205′ of rectifier 206. A resistor 207 and lamp 202 are connected in series circuit across winding 203. The output terminals 208, 208′ are connected to an external auxiliary load circuit, such as an alarm (not shown). Winding 204 of transformer 195 is connected across a rectifier 209, the load terminals 210, 210′ of which may be connected to an auxiliary load.

A pair of test switches 211 and 211′ are provided in order to test relay 10 when it is connected into the system being controlled without triggering the circuit breaker. These test switches interconnect the power amplifier 125 and the oscillators 91 and 91′ shown in blocks I and I′ and upon actuation of the switches disconnect the oscillators from the power amplifier and temporarily disconnect and reconnect the oscillators from and to the power supply 27.

Referring to FIGS. 1 and 2, test switch 211 comprising a pair of normally closed contacts 212 and 213 and normally open contacts 214 has its contacts 212 in their closed position interconnecting power amplifier 125 with oscillator 91 through terminals 116′. Contacts 213 in their closed position interconnect conductor 105′ of oscillator 91 through conductor 215, switch 216, conductor 105 to terminal 104 of the power supply 27.

Test switch 211′ comprising a pair of normally closed contacts 216′ and 217 and normally open contacts 218 has its contacts 216′ in their closed position interconnecting terminal 104 of the power supply 27 through conductor 105, switch 216, conductor 219, contacts 216′ conductor 105′a to oscillator 91′ in FIG. 3. Contacts 217 of test switch 211′ in their closed position interconnect a load terminal 220′ of a rectifier 221 having its input terminals 222, 222′ connected across winding 204′ of transformer 195′ of oscillator 91′ through conductor 223 to power amplifier 125. The normally open contacts 218 of test switch 211′ shunt contacts 216′ of test switch 211′ and in their closed position interconnect terminal 104 of the power supply 27 through conductor 105, switch 216, conductor 219, contacts 218, conductor 105′a to oscillator 91′.

In performing a test operation to see if the pulse timing unit shown in blocks A through I is active, test switch 211 is actuated opening contacts 212 and 213 thereof. In so doing contacts 213 are opened before contacts 214 are closed. By opening test switch 211 the circuit from oscillator 91 to power amplifier 125 is interrupted while the closing of contacts 214 complete a circuit from terminal 104 of the power supply 27 through conductor 105, switch 216, conductor 215, contacts 214 of test switch 211, conductor 105′, resistor 103′, low potential winding 101′, collector 100′ and emitter 99′ of transistor 97′, diode 123′ to ground conductor 25. Upon proper adjustment of resistor 44 the circuit of the time duration portion of the contour relay in blocks A through I can be rendered conductive but breaker 12 will not be tripped open because the contacts 212 of test switch 211 have been opened. The energization of winding 101′ of transformer 102′ will energize winding 117′ and in turn ignite lamp 126 indicating that the portion of relay system 10 in blocks A through I is properly functioning.

While test switch 211 is being operated to test the function of the pulse time sensing portion of the contour relay, the pulse amplitude portion of the relay structure is still functioning uninterruptedly to sense and control the pulses from the source of supply 11.

Upon the returning to normal position of test switch 211 wherein contacts 212 and 213 are closed the pulse amplitude portion of the contour relay may be tested. When switch 211′ is closed so that contacts 216′ thereof open before contacts 218 are closed, the circuit from load winding 204′ of oscillator 91′ through the load terminal 220′ of rectifier 221, conductor 223, contacts 217 of test switch 211′ to power amplifier 125 is interrupted. The closing of contacts 218 connects terminal 104 of the power supply 27 through conductor 105, switch 216, conductor 219, contacts 218 of test switch 211′, conductor 105′a, resistor 196′, low potential winding 194′ of transformer 195′, collector 193′, emitter 192′ of transistor 190′, diode 225′ to ground conductor 25. Energization of winding 194′ of transformer 195′ energizes winding 203′ and ignites lamp 226 in series therewith indicating that the pulse amplitude discriminator part of the contour relay structure 10 is functional.

Switches 216 and 227 are provided for resetting the oscillators 90, 91 and 90′ and 91′ during a normal functioning of the pulse contour relay in the following manner: contacts 216 associated with the circuit breaker 13 open automatically when the circuit breaker opens. When contacts 216 and ciricuit breaker 13 are closed oscillators 91 and 91′ of blocks I and I′ are connected to terminal 104 of the power supply 27. When the contour relay 10 functions either one of the oscillators in blocks I and I' is brought into operation and continues to operate unless its power supply 27 is temporarily interrupted. This temporary interruption of power supply 27 is automatically performed by auxiliary contact 216 of circuit breaker 13 making the relay system ready for reenergization and reclosing of the circuit breaker 13. Contacts 227 are part of a manually reset switch which controls oscillators 90, 90' in blocks H and H' and permits extinguishing of indicating lights 111 and 202. Operation of the manually operated switch 227 is not necessary for reclosing of the circuit breaker if one does not wish to keep track of the number of times of relay operation by observing the indicating lights.

The pulse contour relay functions as a protective device arranged between the source of pulses being controlled and the circuit breaker structure controlling said source. In operation the pulse contour relay senses separately and independently and/or simultaneously the pulse amplitude and the pulse duration of each pulse emitted from a source of pulses. This sensing procedure takes place repeatedly.

When shunt 15 in FIG. 1 emits a pulse it is split into two channels. One channel is fed into the pulse duration portion of the relay structure illustrated by blocks A through I of FIG. 1 and the other channel is fed into the pulse amplitude portion of the relay structure illustrated by blocks J, K, H' and I'.

The pulse fed into block A which is a pulse timing sensing unit is transmitted to block B which is a pulse repeater circuit. At this point the pulse is split into two channels one of which is fed into block C which is a pulse inverting circuit and the other portion of the pulse is fed into block D which is a pulse timing reference circuit. The pulse from block D is fed into the monostable flip flop circuit shown in block E and then to the comparison circuit in block F. The inverted pulse in block C is fed into the comparison circuit in block F. If comparison circuit in block F emits a residual pulse of suitable polarity it is fed into the monostable flip flop circuit shown in block G.

The residual pulse emitted by the comparison circuit in block F is used to trigger the flip flop circuit in block G and the circuit in block G then feeds a signal to the oscillators in blocks H and I.

The oscillator in block H energizes a light or any other suitable signaling device while the oscillator in block I trips the circuit breaker 13 by energizing coil 12.

The pulse emitted by shunt 15 is also fed into block J which is a pulse amplitude limiter circuit. If the pulse fed into this circuit exceeds the voltage rating of the zener reference voltage diode 152 shown in FIG. 3 the excess voltage is transmitted to the circuit in block K which is a repeater circuit functioning as a monostable flip flop circuit. The circuit in block K when excited actuates the oscillators in blocks H' and I'. The oscillator in block H' actuates a signal device such as a light or alarm and the oscillator in block I' energizes coil 12 which opens the circuit breaker 13.

Although but one embodiment of the present invention has been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A device for sensing the contour of electrical pulses emitted from a source of pulses comprising:
   pulse repeater means responsive to the source pulses for producing repeated pulses having the same duration as each of said source pulses and having a limited amplitude,
   pulse time reference means responsive to the source pulses for producing reference pulses of preselected amplitude and duration,
   means for inverting said repeated pulses,
   pulse comparison means connected to receive the reference pulses and the inverted pulses for producing residual pulses having durations varying as a function of the difference between the duration of said reference pulses and said inverted pulses, and
   means responsive to the residual pulses for producing an output when at least one of said residual pulses has a preselected duration.

2. A device according to claim 1 wherein said reference pulses each begin at substantially the same time as each corresponding source pulse.

3. A device for sensing the contour of electrical pulses emitted from a source of pulses comprising:
   pulse repeater means responsive to the source pulses for producing repeated pulses having the same duration as each of said source pulses and having a limited amplitude,
   a capacitance circuit connected to be charged by the initiation of each repeated pulse and to discharge at a preselected rate,
   means responsive to the charge of the capacitance circuit to initiate reference pulses of preselected amplitude upon initial charging of the capacitance circuit and for terminating the reference pulse when the capacitance circuit has discharged below a preselected level,
   means for inverting said repeated pulses,
   pulse comparison means connected to receive the reference pulses and the inverted pulses for producing residual pulses having durations proportional to the difference between the duration of said reference pulses and said inverted pulses, and
   means responsive to the residual pulses for producing an output when at least one of said residual pulses has a preselected duration.

4. A device for sensing the contour of electrical pulses emitted from a source of pulses comprising:
   pulse repeater means responsive to the source pulses for producing repeated pulses having the same duration as each of said source pulses and having a limited amplitude relative to a common reference,
   a capacitance circuit having an adjustable time constant connected to be charged by the initiation of each repeated pulse and adjusted to discharge at a preselected rate,
   means responsive to the charge of the capacitance circuit to initiate a reference pulse having an amplitude equal to the limited amplitude of the repeated pulses upon initial charging of the capacitance circuit and for terminating each of said reference pulses when the capacitance circuit has discharged to a preselected level,
   means for inverting said repeated pulses,
   a resistance having two end terminals and a center tap intermediate said terminals with one terminal connected to receive the reference pulses and the other terminal connected to receive the inverted pulses, and
   means connected between the tap and the common reference responsive for producing an output when the electrical potential between said tap and said common reference exceeds a preselected level for a preselected duration.

5. A device according to claim 4 also comprising pulse amplitude means responsive to the source pulses for producing a second output when the amplitude of at least one of said source pulses exceeds a preselected level for a preselected time.

6. A device according to claim 5 wherein said pulse amplitude means comprises a voltage divider connected across the source of pulses, a voltage breakdown device connected to a point on the voltage divider, and a transistor circuit having an input circuit and an output circuit with its input circuit connected to said breakdown device and responsive to conduction of said breakdown device to produce said second output at its output circuit.

References Cited by the Examiner

UNITED STATES PATENTS

| | | | |
|---|---|---|---|
| 2,484,352 | 10/1949 | Miller | 328—112 |
| 2,489,297 | 11/1949 | Laben et al. | 328—114 |
| 2,561,772 | 7/1951 | Atwood | 328—114 |
| 2,934,708 | 4/1960 | Stuntz | 328—146 |
| 2,968,748 | 1/1961 | Davenport | 307—88.5 |
| 3,046,418 | 7/1962 | Eachus | 307—88.5 |
| 3,098,158 | 7/1963 | Wanlass | 307—88.5 |

FOREIGN PATENTS 575,244    5/1954    Canada.

OTHER REFERENCES

Stoner "CQ" entitled, Semiconductors, October 1959, vol. 15, No. 10, pages 62, 63 and 94 and 96.

ARTHUR GAUSS, *Primary Examiner.*

JOHN W. HUCKERT, *Examiner.*